(12) United States Patent
Leong et al.

(10) Patent No.: US 9,450,494 B1
(45) Date of Patent: Sep. 20, 2016

(54) INDUCTIVE COMPENSATION BASED CONTROL OF SYNCHRONOUS RECTIFICATION SWITCH

(71) Applicant: Infineon Technologies Austria AG, Villach (AT)

(72) Inventors: Kenneth Kin Leong, Villach (AT); Klaus Krischan, Graz (AT)

(73) Assignees: Infineon Technologies Austria AG, Villach (AT); Technische Universität Graz, Graz (AT)

( * ) Notice: Subject to any disclaimer, the term of this patent is extended or adjusted under 35 U.S.C. 154(b) by 0 days.

(21) Appl. No.: 14/724,324

(22) Filed: May 28, 2015

(51) Int. Cl.
*H02M 7/217* (2006.01)
*H02M 3/335* (2006.01)
*H02M 7/00* (2006.01)

(52) U.S. Cl.
CPC ......... *H02M 3/33507* (2013.01); *H02M 7/003* (2013.01); *H02M 7/217* (2013.01); *H02M 3/33592* (2013.01)

(58) Field of Classification Search
CPC ............... H02M 7/003; H02M 7/217; H02M 3/33576; H02M 3/33592; H02M 2007/4815; H02M 2007/4818
USPC ............ 363/21.02, 21.03, 21.06, 21.14, 127, 363/146, 147
See application file for complete search history.

(56) References Cited

U.S. PATENT DOCUMENTS

| 6,084,792 | A * | 7/2000 | Chen | H02M 3/33592 363/127 |
|---|---|---|---|---|
| 7,019,337 | B2 * | 3/2006 | Eden | H01L 23/4824 257/107 |
| 7,495,934 | B2 | 2/2009 | Chen et al. | |
| 7,602,154 | B2 | 10/2009 | Fu et al. | |
| 8,649,199 | B2 * | 2/2014 | Seok | H02M 3/33576 363/147 |
| 2004/0222484 | A1 * | 11/2004 | Saxelby | H01L 24/40 257/502 |
| 2011/0051464 | A1 * | 3/2011 | Lou | H02M 3/33592 363/21.02 |
| 2012/0063175 | A1 * | 3/2012 | Wang | H02M 3/33592 363/21.14 |

OTHER PUBLICATIONS

"Secondary Side Synchronous Rectification Driver for High Efficiency SMPS Topologies", NCP4304A, NCP4304B, ON Semiconductor, May 2014.
Maniktala, Sanjaya, "Understanding and Using LLC Converters to Great Advantage", Microsemi, Analog Mixed Signal Group, Mar. 2013.

* cited by examiner

*Primary Examiner* — Gary L Laxton
(74) *Attorney, Agent, or Firm* — Murphy, Bilak & Homiller, PLLC

(57) ABSTRACT

An electronic device includes a synchronous rectification circuit having an actively controlled switching element through which resonant current flows during operation. The actively controlled switching element is disposed in a package which adds stray inductance to a main current path of the synchronous rectification circuit. The electronic device also includes a fixed inductor magnetically coupled to the stray inductance or an additional inductance in series with the stray inductance so that the fixed inductor is not in the main current path of the synchronous rectification circuit and change in current through the inductance to which the fixed inductor is magnetically coupled induces a reference voltage at the fixed inductor which is in phase with a zero crossing point of the resonant current at different switching frequencies of the actively controlled switching element. A corresponding method of controlling the electronic device is also described.

20 Claims, 14 Drawing Sheets

INDUCTIVE COMPENSATION BASED CONTROL OF SYNCHRONOUS RECTIFICATION SWITCH

TECHNICAL FIELD

The present application relates to synchronous rectification switches, in particular accurate control of synchronous rectification switches.

BACKGROUND

Accurate control of a synchronous rectification switch is difficult to achieve where zero crossing point detection of the resonant current through the switch is required. This includes accurate control of a synchronous rectification switch on the secondary side of an LLC converter, where accurate zero crossing point detection of the resonant current through the secondary side synchronous rectification switch directly affects efficiency.

FIG. 1 illustrates an exemplary synchronous rectification switch implemented as a MOSFET Q1. Due to the inductance (Lpkg) of the package in which the MOSFET Ts is included, the drain-source voltage $d_{d's'}$ measurable at the package terminals d', s' has a leading phase difference with respect to the current $i_{SR}$ through the MOSFET Ts. The package is graphically illustrated as a dashed box in FIG. 1. If the sensed $d_{d's'}$ voltage is used to detect the zero crossing point of the resonant current $I_{SR}$, the MOSFET Ts will be turned off while the device is still conducting current. This switching condition leads to poor efficiency.

FIG. 2 illustrates this problem in greater detail, where $V_{d's'}$ is the drain-source voltage measured at the package terminals d', s', $i_{SR}$ is the resonant current through the MOSFET Ts, $V_{ds}$ is the actual MOSFET drain-source voltage, $V_{gsSR}$ is the control voltage applied to the gate of the MOSFET Ts, $V_{th}$ corresponds to the threshold voltage of the MOSFET Ts, $t_{on}$ is the actual time the MOSFET Ts is on, and $t_\theta$ represents the variability in the switch off period due to the phase difference between $d_{d's'}$ and $I_{SR}$. At a fixed frequency, the phase difference between $V_{d's'}$ and $I_{SR}$ is fixed and therefore may be compensated easily. However, when the switching frequency changes, the phase difference also changes proportionally which further complicates the zero crossing point detection. This is illustrated in FIG. 2 by the two different $V_{d's'}$ curves (a) and (b), each one of which corresponds to a different switching frequency.

Several methods have been proposed to address accurate zero crossing point detection. These methods involve complex sensing circuitry or control algorithms. A simple and accurate solution is therefore desirable.

SUMMARY

According to an embodiment of an electronic device, the electronic device comprises a synchronous rectification circuit comprising an actively controlled switching element through which resonant current flows during operation. The actively controlled switching element is disposed in a package which adds stray inductance to a main current path of the synchronous rectification circuit. The electronic device also comprises a fixed inductor magnetically coupled to the stray inductance or an additional inductance in series with the stray inductance so that the fixed inductor is not in the main current path of the synchronous rectification circuit and change in current through the inductance to which the fixed inductor is magnetically coupled induces a reference voltage at the fixed inductor which is in phase with a zero crossing point of the resonant current at different switching frequencies of the actively controlled switching element.

According to an embodiment of a method of controlling an electronic device which comprises a synchronous rectification circuit having an actively controlled switching element through which resonant current flows during operation, the actively controlled switching element being disposed in a package which adds stray inductance to a main current path of the synchronous rectification circuit, the method comprises: magnetically coupling a fixed inductor to the stray inductance or an additional inductance in series with the stray inductance so that the fixed inductor is not in the main current path of the synchronous rectification circuit and change in current through the inductance to which the fixed inductor is magnetically coupled induces a reference voltage at the fixed inductor which is in phase with a zero crossing point of the resonant current at different switching frequencies of the actively controlled switching element; and controlling switching of the actively controlled switching element based on a zero crossing point of the voltage induced at the fixed inductor.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

According to the embodiments described herein, the zero crossing point of the resonant current through a synchronous rectification switch is detected by compensating the stray inductance of the switching circuit with a fixed inductor. The fixed inductor is magnetically coupled to the stray inductance or an additional inductance in series with the stray inductance, but is not in the main current path of the synchronous rectification circuit. This way, the sensed compensated voltage is in phase with the current through the device at different switching frequencies and the fixed inductor need not be sized to accommodate the full power of the switch. As a result, the control of the synchronous rectification switch instantly reacts to changes in switching frequency and is relatively temperature insensitive. In addition, active switches are not needed in the compensation network. Direct compensation and indirect compensation methods are described next in greater detail.

Figure 1:
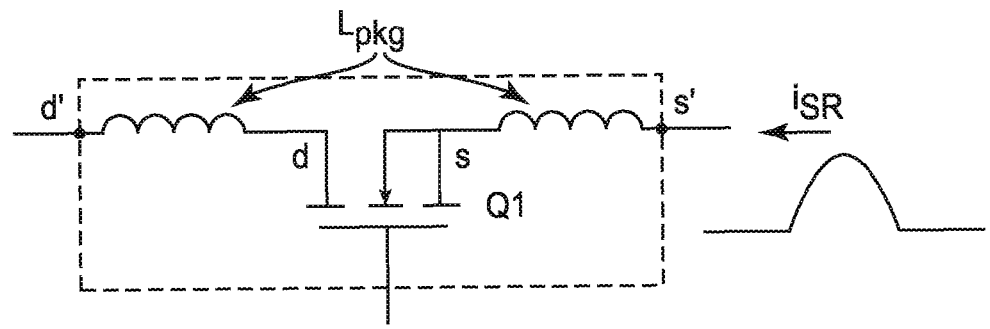
FIG. 1 illustrates a schematic diagram of a packaged synchronous rectification switch.
Figure 2:
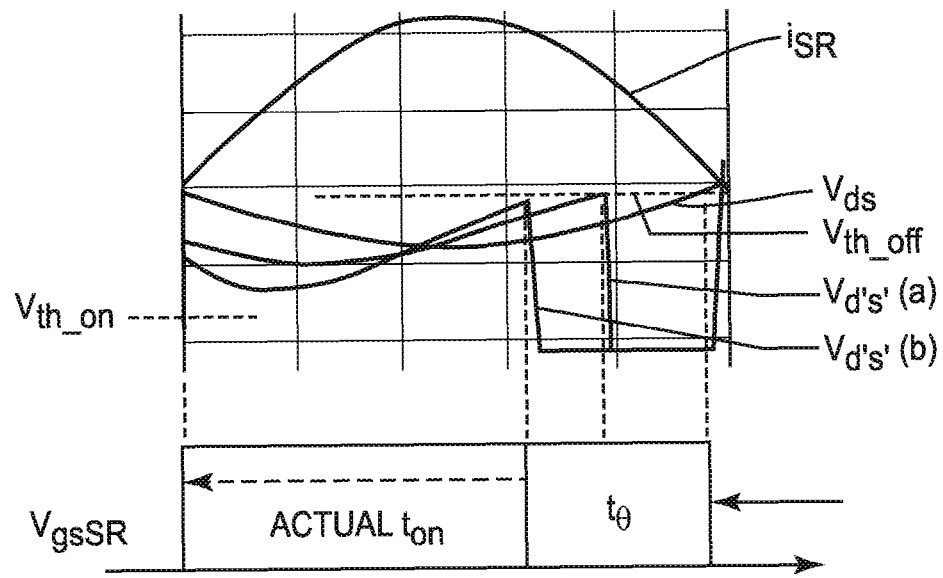
FIG. 2 illustrates voltage and current waveforms associated with the operation of the packaged synchronous rectification switch shown in FIG. 1.
Figure 3:
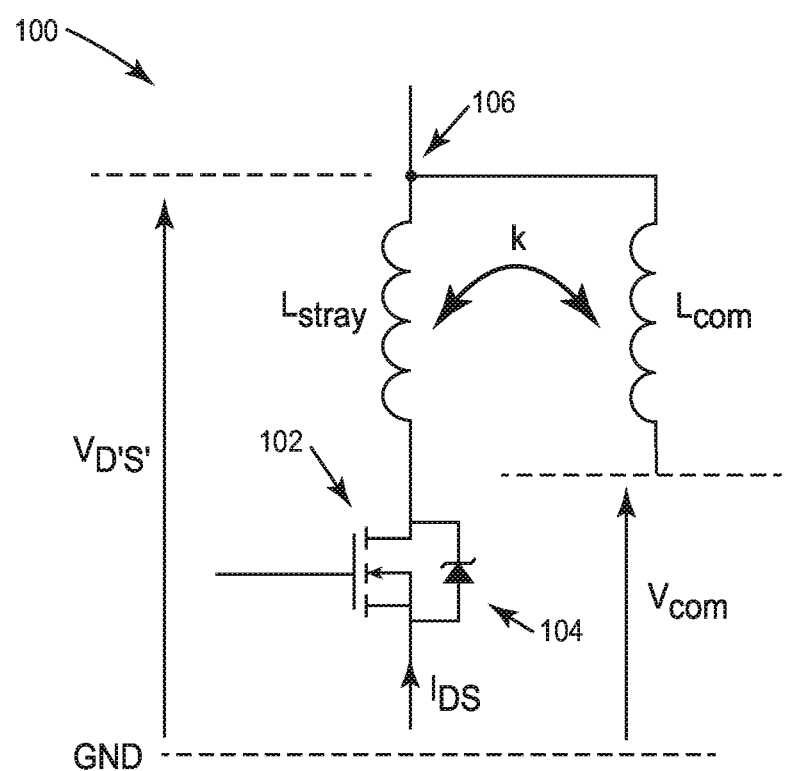
FIG. 3 illustrates a schematic diagram of an embodiment of a direct inductive compensation circuit for a synchronous rectification switch.

FIG. 3 illustrates an embodiment of the direct compensation method. In FIG. 3, an electronic device includes a synchronous rectification circuit 100 comprising an actively controlled switching element 102 through which resonant current ($I_{DS}$) flows during operation. In an example, the synchronous rectification circuit 100 is an LLC converter and the actively controlled switching element 102 is the secondary side synchronous rectification switch of the LLC converter. In general, the actively controlled switching element 102 is disposed in a package which adds stray inductance ($L_{stray}$) to the main current path ($I_{DS}$) of the synchronous rectification circuit 100. The dashed lines in FIG. 3 indicate external measurement points available at the package. Various package types can be used to house the actively controlled switching element 102. The package is not shown in FIG. 3 for ease of illustration. The actively controlled switching element 102 is illustrated as a MOSFET (metal oxide semiconductor field effect transistor) having an integrated body diode 104, but could be an IGBT (insulated gate bipolar transistor) or other type of actively controlled switching element.

In each case, a fixed inductor $L_{com}$ is magnetically coupled to the stray inductance $L_{stray}$ or an additional inductance in series with the stray inductance $L_{stray}$ so that the fixed inductor $L_{com}$ is not in the main current path $I_{DS}$ of the synchronous rectification circuit 100. According to an embodiment, the fixed inductor $L_{com}$ is electrically connected at one terminal 106 to the inductance to which the fixed inductor $L_{com}$ is magnetically coupled without being directly in series with the main power path $I_{DS}$ of the actively controlled switching element 102. In FIG. 3, the fixed inductor $L_{com}$ is shown magnetically coupled to the stray inductance $L_{stray}$ of the package where k is the coupling factor. Change in current through the inductance to which the fixed inductor $L_{com}$ is magnetically coupled induces a reference voltage $V_{com}$ at the fixed inductor $L_{com}$ which is in phase with the zero crossing point of the resonant current $I_{DS}$ at different switching frequencies of the actively controlled switching element 102.

Figure 4:
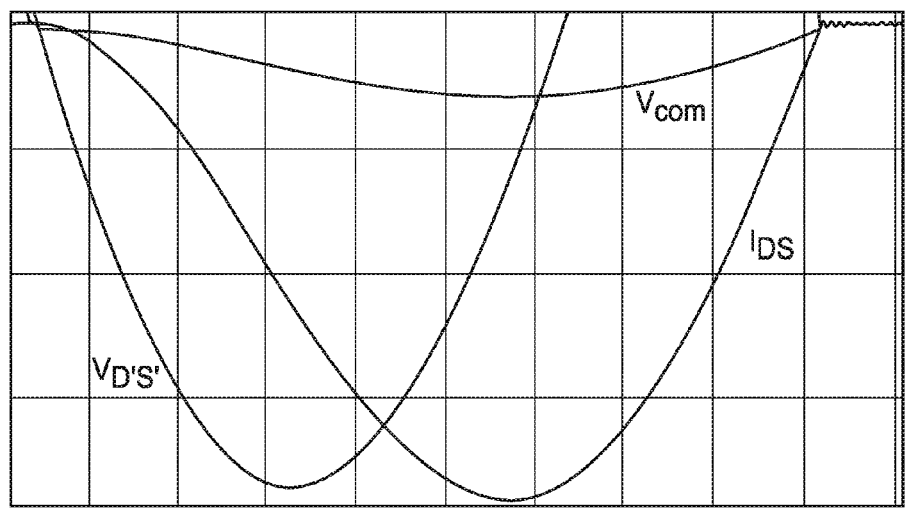
FIG. 4 illustrates voltage and current waveforms associated with the operation of the synchronous rectification switch shown in FIG. 3.

FIG. 4 illustrates the voltage and current waveforms of primary interest. The fixed coupled inductor $L_{com}$ compensates for the voltage drop along the stray inductance $L_{stray}$, thus the phase shifted $V_{D'S'}$ measurement at the terminals of the package is replaced by the compensated $V_{com}$ measurement, which is always in phase with the resonant (commutation) current $I_{DS}$ through the actively controlled switching element 102 at a wide range of switching frequencies.

With the direct compensation method, the fixed inductor $L_{com}$ is magnetically coupled to the stray inductance $L_{stray}$ of the package. Accordingly, the fixed inductor $L_{com}$ and the coupling factor k should be tuned to the specific device package and $L_{stray}$ values. The fixed inductor $L_{com}$ can be designed into the device package itself, or can be an external inductor outside the device package. In an example, the fixed inductor $L_{com}$ can be implemented as a copper track type inductor on a PCB (printed circuit board). The value of the coupling factor k varies depending on the design of the fixed inductor $L_{com}$ and its proximity to the stray inductance $L_{stray}$, and the permeability of the material interposed between $L_{com}$ and $L_{stray}$. However, since these parameters can be fixed, the value of k should also be a constant value with the direct compensation method. The measured voltage $V_{com}$ is only a sensing point, therefore the fixed inductor $L_{com}$ is not required to conduct any real current and therefore can be physically small. This way, the fixed inductor $L_{com}$ and the stray inductance $L_{stray}$ can be mismatched since the stray inductance $L_{stray}$ is in the main current path $I_{DS}$ of the synchronous rectification circuit 100 while the fixed inductor $L_{com}$ is not in the main current path $I_{DS}$.

Figure 5B:
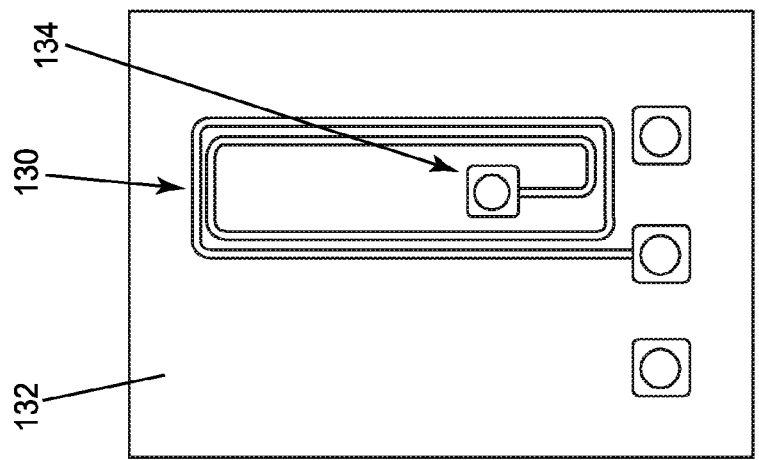
FIG. 5B illustrates a plan view of an embodiment of the direct inductive compensation circuit shown in FIG. 5A.
Figure 5A:
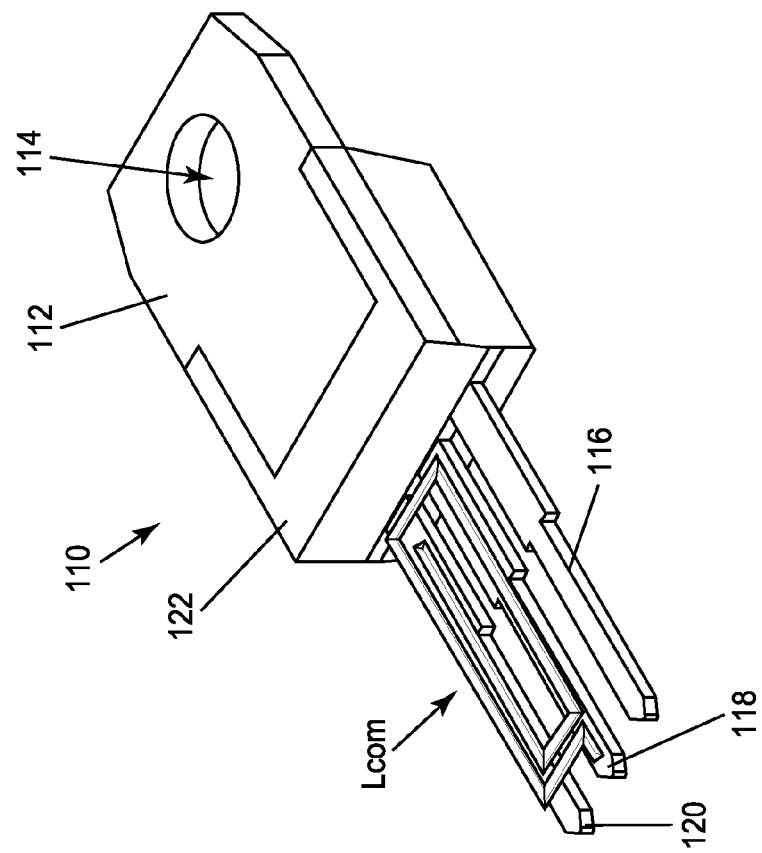
FIG. 5A illustrates a perspective view of an embodiment of a direct inductive compensation circuit for a packaged synchronous rectification switch.

FIGS. 5A and 5B illustrate an exemplary package implementation of the direct compensation method. According to this embodiment, the actively controlled switching element 102 is a packaged in a TO (transistor outline) type package 110 such as the TO-220 package. The TO-220 package is a power package intended for power semiconductors and an example of a through-hole design rather than a surface-mount technology type of package. The top of the package 110 has a metal tab 112 with a hole 114 used in mounting the package 110 to a heat sink (not shown). The TO-220 package 110 has three leads 116, 118, 120 which protrude from a material 122 such as a mold compound which encases the actively controlled switching element 102. The terminals include a gate lead 116, a drain (collector) lead 118 and a source (emitter) lead 120. The terminals 116, 118, 120 are a component of the overall stray inductance $L_{stray}$ of the package 110. Similar packages with two, four, five or seven leads are also available.

The fixed inductor $L_{com}$ is disposed outside the package 110 according to this embodiment, as schematically illustrated in FIG. 5A. In this example, the fixed inductor $L_{com}$ is magnetically coupled to the stray inductance $L_{stray}$ of the drain and source leads 118, 120. FIG. 5B shows an implementation embodiment for the fixed inductor $L_{com}$, in which the fixed inductor $L_{com}$ comprises a winding 130 on a circuit board 132 such as a PCB. The circuit board 132 can be positioned in close proximity to the package 110 so that the winding 130 is magnetically coupled to the stray inductance $L_{stray}$ of the source (emitter) and/or drain (collector) leads 118, 120. For example, the circuit board 132 can be glued or otherwise attached to the leads 116, 118, 120. One terminal 134 of the winding 130 can be electrically connected to the drain (collector) lead 118 without being directly in series with the main power path of the actively controlled switching element 102. The actively controlled switching element 102 can be packaged in a different type of through-hole package e.g. such as the TO-247, and the fixed inductor $L_{com}$ can be attached to the exterior surface of the package 110, embedded in the packaging material 122 or even disposed inside the package 110 with external points of contact for the direct compensation method.

Figure 6:
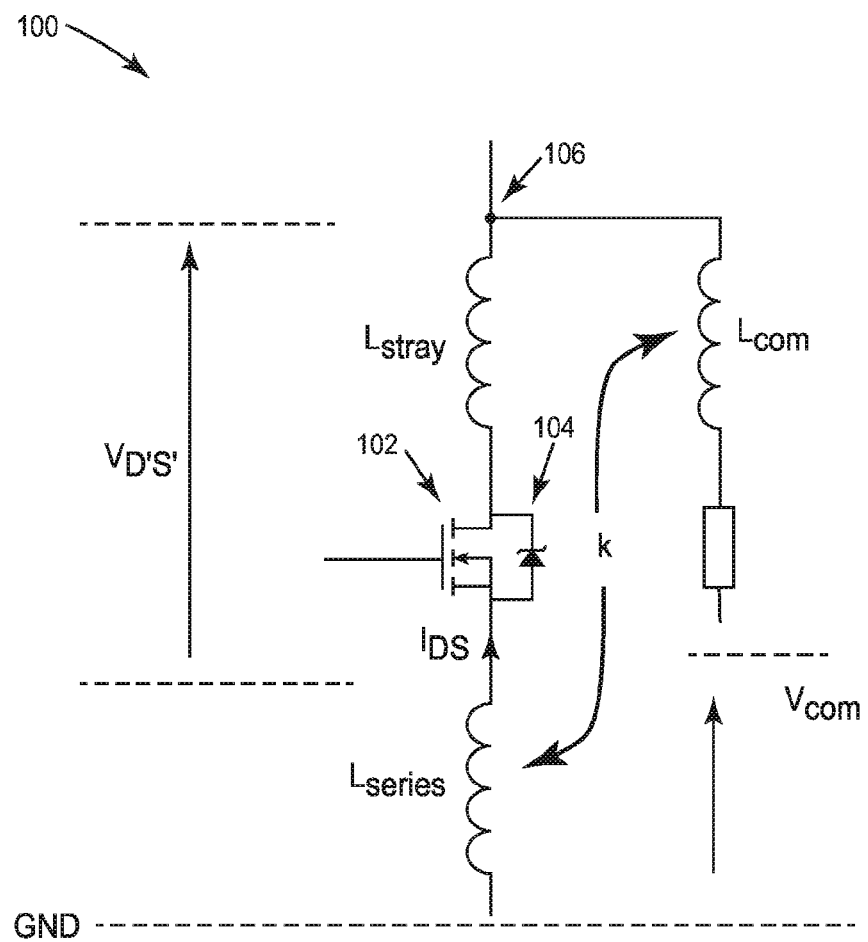
FIG. 6 illustrates a schematic diagram of an embodiment of an indirect inductive compensation circuit for a synchronous rectification switch.

FIG. 6 illustrates an embodiment of the synchronous rectification circuit 100 according to the indirect compensation method. According to this embodiment, an additional (series) inductor ($L_{series}$) is connected in series with the actively controlled switching element 102 between the source (emitter) of the switching element 102 and ground (GND). The fixed inductor $L_{com}$ is magnetically coupled to the series inductor $L_{series}$ to provide the compensated voltage measurement $V_{com}$. The fixed inductor $L_{com}$ is electrically connected at one terminal 106 to the stray inductance $L_{stray}$ without being directly in series with the main power path ($I_{DS}$) of the actively controlled switching element 102. The fixed inductor $L_{com}$ is magnetically isolated from the stray inductance $L_{stray}$ of the package.

Figure 7:
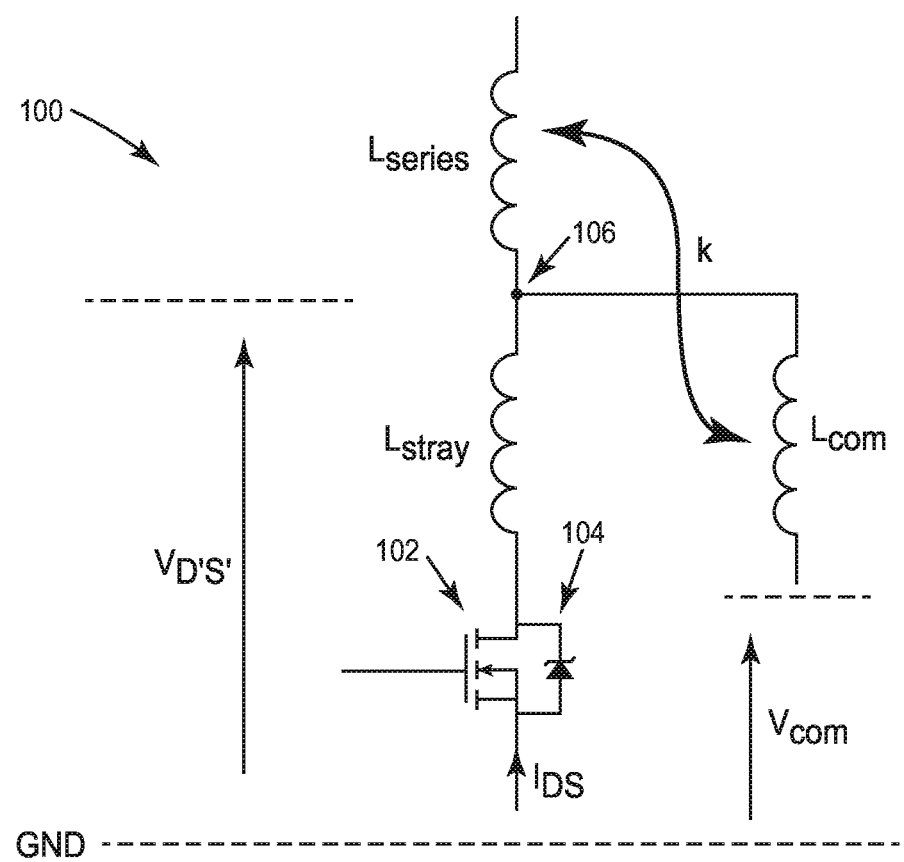
FIG. 7 illustrates a schematic diagram of another embodiment of an indirect inductive compensation circuit for a synchronous rectification switch.

FIG. 7 illustrates another embodiment of the synchronous rectification circuit 100 according to the indirect compensation method. According to this embodiment, the series inductor $L_{series}$ is connected in series with the stray inductance of the package on the drain side of the actively controlled switching element and one terminal of the fixed inductor $L_{com}$ is electrically connected between the series inductor and the stray inductance without being directly in series with the main power path ($I_{DS}$) of the actively controlled switching element.

Figure 8:
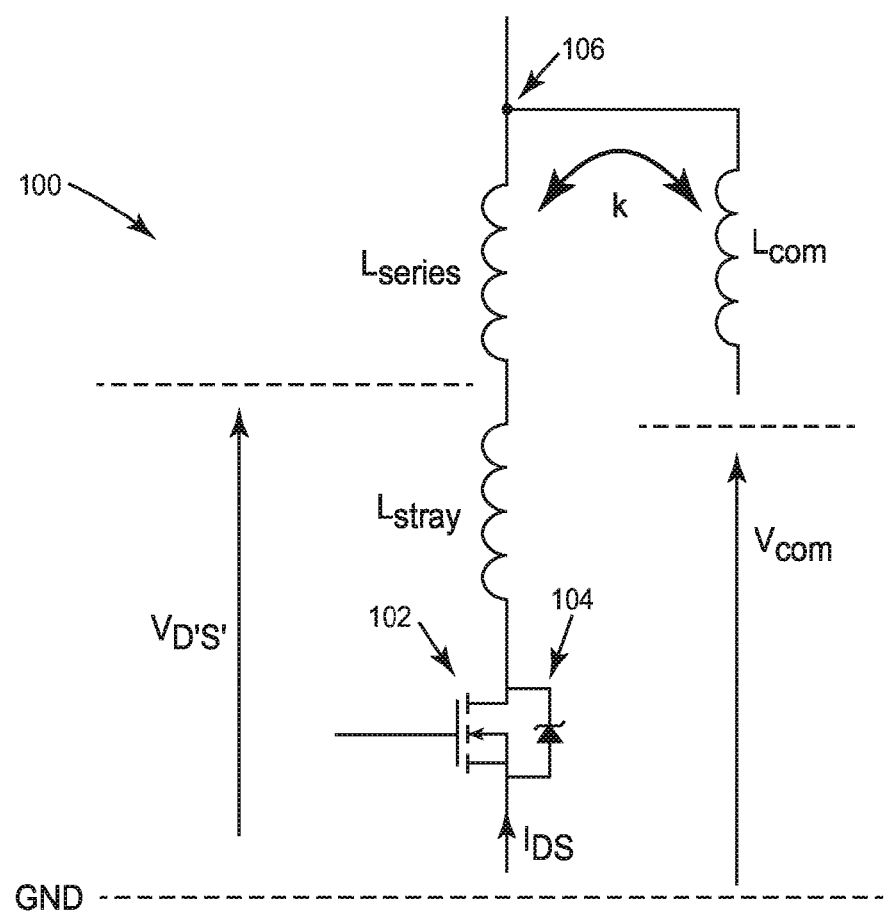
FIG. 8 illustrates a schematic diagram of yet another embodiment of an indirect inductive compensation circuit for a synchronous rectification switch.

FIG. 8 illustrates yet another embodiment of the synchronous rectification circuit 100 according to the indirect compensation method. The embodiment shown in FIG. 8 is similar to the embodiment shown in FIG. 7. Different however, the series inductor $L_{series}$ is disposed on top of the package and the fixed inductor $L_{com}$ is disposed on top of the series inductor $L_{series}$ as schematically illustrated in FIG. 8. Also, the one terminal 106 of the fixed inductor $L_{com}$ is electrically connected to the opposite terminal of the series inductor $L_{series}$ as shown in FIG. 7. The series inductor $L_{series}$ remains directly in the main power path ($I_{DS}$) of the actively controlled switching element 102.

FIGS. 6 through 8 illustrate different configurations of the indirect compensation method. In each case, the fixed inductor $L_{com}$ is electrically connected at the drain (collector) potential of the synchronous rectification circuit 100 to maintain the same inductive voltage to be compensated for as in the direct compensation method. With the indirect compensation method, the mechanical design of the fixed inductor $L_{com}$ is less restrictive in terms of available space and in terms of coupling to the stray inductance $L_{stray}$ of the device package. The values of the series inductor $L_{series}$ should be as small as possible since the series inductor $L_{series}$ adds to the overall series inductance of the device. Furthermore, the design of the series inductor $L_{series}$ should ensure that the current carrying capability of $L_{series}$ matches that of the actively controlled switching element 102. The configuration shown in FIG. 6 where the series inductor $L_{series}$ is on the source side of the switch 102 might involve additional circuitry, since an additional contact may be available for sensing a potential difference from common ground (source).

Figure 9:
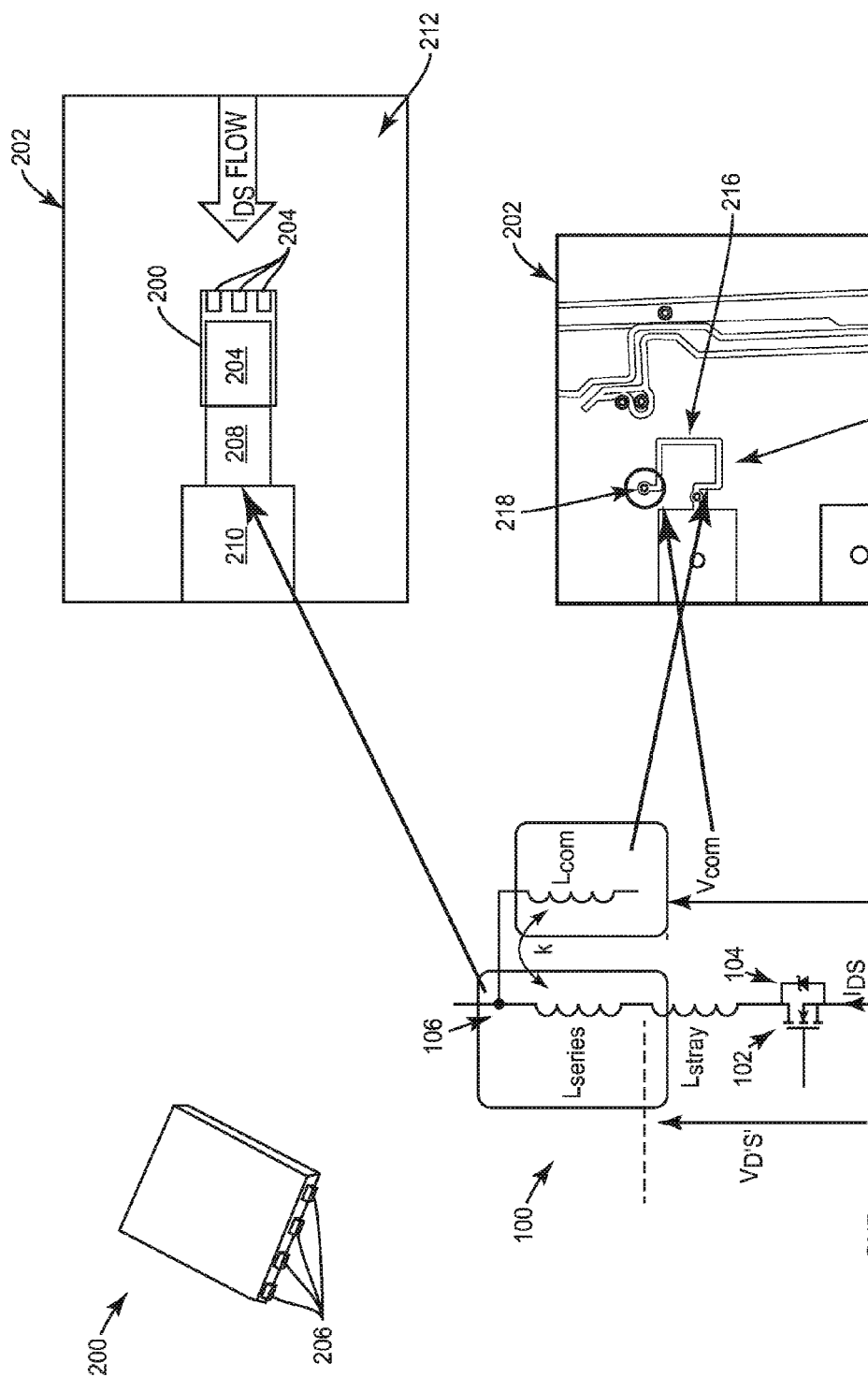
FIG. 9 illustrates different views of a circuit board based embodiment of an indirect inductive compensation circuit for a packaged synchronous rectification switch.

FIG. 9 illustrates an exemplary package implementation of the indirect compensation method. According to this embodiment, the actively controlled switching element 102 is disposed in a package 200 such as a surface mount type package like the SuperSO8 or S2O8 which is attached to a circuit board 202 such as a PCB. The circuit board 202 has terminals/pads 204 to which corresponding terminals 206 of the package 200 are to be attached. The circuit board 202 also has an added first winding 208 which connects the output of the package 200 to an output metal trace 210 formed in a first layer 212 of the circuit board 202. The first winding 208 formed in the first layer 212 of the circuit board 202 corresponds to the series inductor $L_{series}$ previously described herein, and is in series with the stray inductance $L_{stray}$ of the package 200. A second winding 214 formed in a second layer 216 of the circuit board 202 is magnetically coupled to the first winding 208. In FIG. 9, the series inductor winding 208 and the package 200 are disposed at a first side of the circuit board 202 and the fixed inductor winding 214 is disposed at a second side of the circuit board 202 opposite the first side. Also, the series inductor winding 208 is implemented as a copper trace formed in a first layer 212 of the circuit board 202 and the fixed inductor winding 214 has one or more turns and is formed in a second layer 216 of the circuit board 202. Further according to this embodiment, the fixed inductor winding 214 is electrically connected at one terminal 106 to the series inductor winding 214 by a conductive via 218 which extends through the circuit board.

Described next are various embodiments of control, phase tuning and protection circuitry for use with the synchronous rectification circuit and fixed inductor previously described herein.

Figure 10:
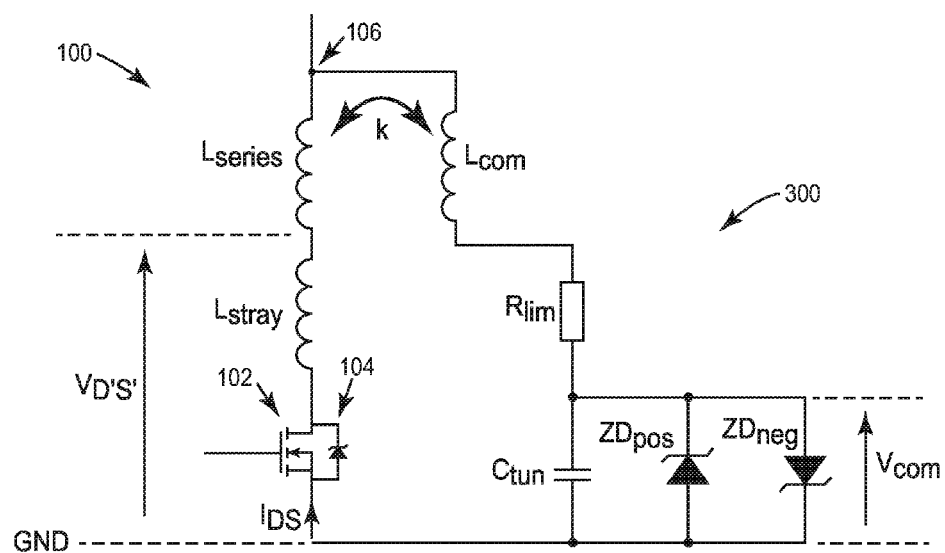
FIG. 10 illustrates a schematic diagram of an embodiment of phase tuning and protection circuitry for a synchronous rectification switch inductive compensation circuit.

FIG. 10 illustrates an embodiment phase tuning and protection circuitry 300 for use with the synchronous rectification circuit 100 and fixed inductor $L_{com}$. For either the direct or indirect compensation methods, the design of the fixed inductor $L_{com}$ (direct compensation method) or the fixed inductor $L_{com}$ and the series $L_{series}$ (indirect compensation method) should compensate the phase difference caused by the stray inductance $L_{stray}$. Also, the fixed inductor $L_{com}$ (direct compensation method) or the fixed inductor $L_{com}$ and the series $L_{series}$ (indirect compensation method) should fit a specific device package such as SuperSO8, TO-220, TO-247, etc. However, even the same device with the same package, manufactured under the same batch can have individual variations in $L_{stray}$. This can affect the phase compensation accuracy, which can be increased by adding a low value series capacitor $C_{tun}$ for tuning the phase difference after the design of $L_{com}$ (direct compensation method) or $L_{com}$ and $L_{series}$ (indirect compensation method) have been fixed. As such, $C_{tun}$ compensates for the stray inductance differing from an expected nominal value and tunes the zero crossing point.

A high value resistor $R_{lim}$ can be added in series with the fixed inductor $L_{com}$ for limiting the current flow through the $L_{com}$ sensing path to ground. Furthermore, two anti-parallel Zener diodes $ZD_{pos}$ and $ZD_{neg}$ can be placed in parallel with $C_{tun}$ for limiting the maximum positive/negative voltage that can be seen by $C_{tun}$ and the rest of the sensing circuitry. Other diode types are also possible as long as their threshold voltages are not too low that they turn on during normal operation. Since $C_{tun}$ can be a very low value, close to the combined output capacitance of the Zener diodes $ZD_{pos}$, $ZD_{neg}$ and the input capacitance of the sensing circuitry, the added parallel capacitance from these devices can have an influence in choosing the value of $C_{tun}$.

Various types of control circuits can be used to control the switching signal applied to the gate of the actively controlled switching element 102. In each case, the control circuitry is operable to control switching of the actively controlled switching element 102 based on the zero crossing point of the reference voltage $V_{com}$.

Figure 11:
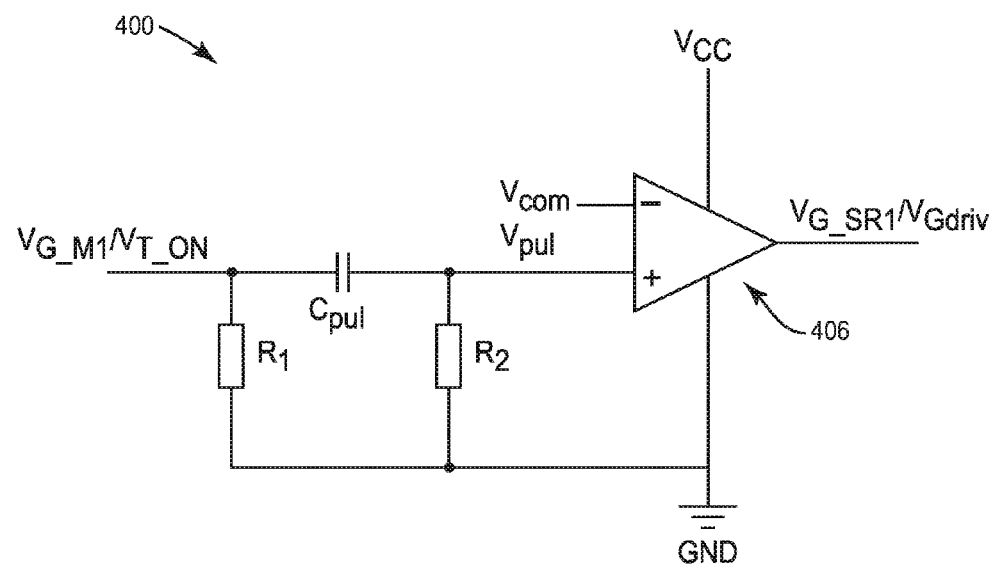
FIG. 11 illustrates a schematic diagram of an embodiment of an analog controller for a synchronous rectification switch inductive compensation circuit.
Figure 12:
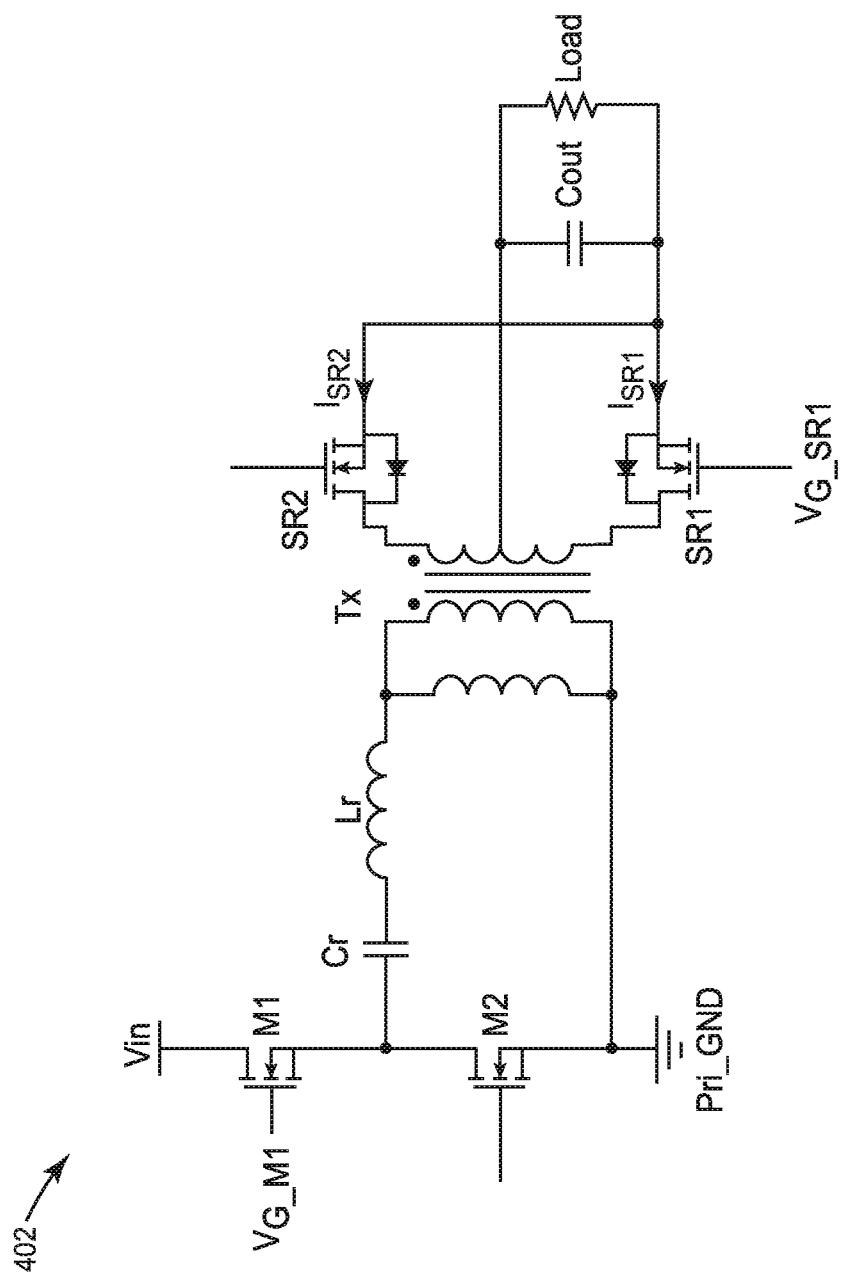
FIG. 12 illustrates a schematic diagram of an embodiment of an LLC converter for which an inductive compensation circuit is used to accurately control the secondary side synchronous rectification switches of the LLC converter.

FIG. 11 illustrates an embodiment of a single comparator controller 400. The associated LLC converter 402 is shown in FIG. 12. The fixed inductor $L_{com}$ is magnetically coupled to the stray inductance $L_{stray}$ of actively controlled switching element SR1 and SR2 or an additional inductance in series with these stray inductances. Each actively controlled switching element SR1 and SR2 is electrically connected to one terminal of a secondary transformer winding of the LLC converter 402, and provides synchronous rectification on the secondary side of the LLC converter 402. Only the control of actively controlled switching element SR1 is described next. The same control is applied to actively controlled switching element SR2 in connection with transistor M2.

The single comparator controller 400 also includes a single high speed comparator 406 which compares the reference voltage $V_{com}$ against signal Vpul. The Vpul signal is a modified version of the $V_{G\_M1}$ signal which is the primary side driving signal for transistor M1. Signal $V_{G\_M1}$ goes into an RCR network formed by resistor R1, capacitor Cpul and resistor R2. The RCR network turns the square signal into a pulse type signal which triggers the turn on of $V_{G\_SR1}$ with $V_{G\_M1}$, but goes back to zero voltage as soon as $C_{pul}$ is charged and then generates a negative pulse when $V_{G\_M1}$ switches off and discharges $C_{pul}$ via $R_1$ and $R_2$.

Figure 13:
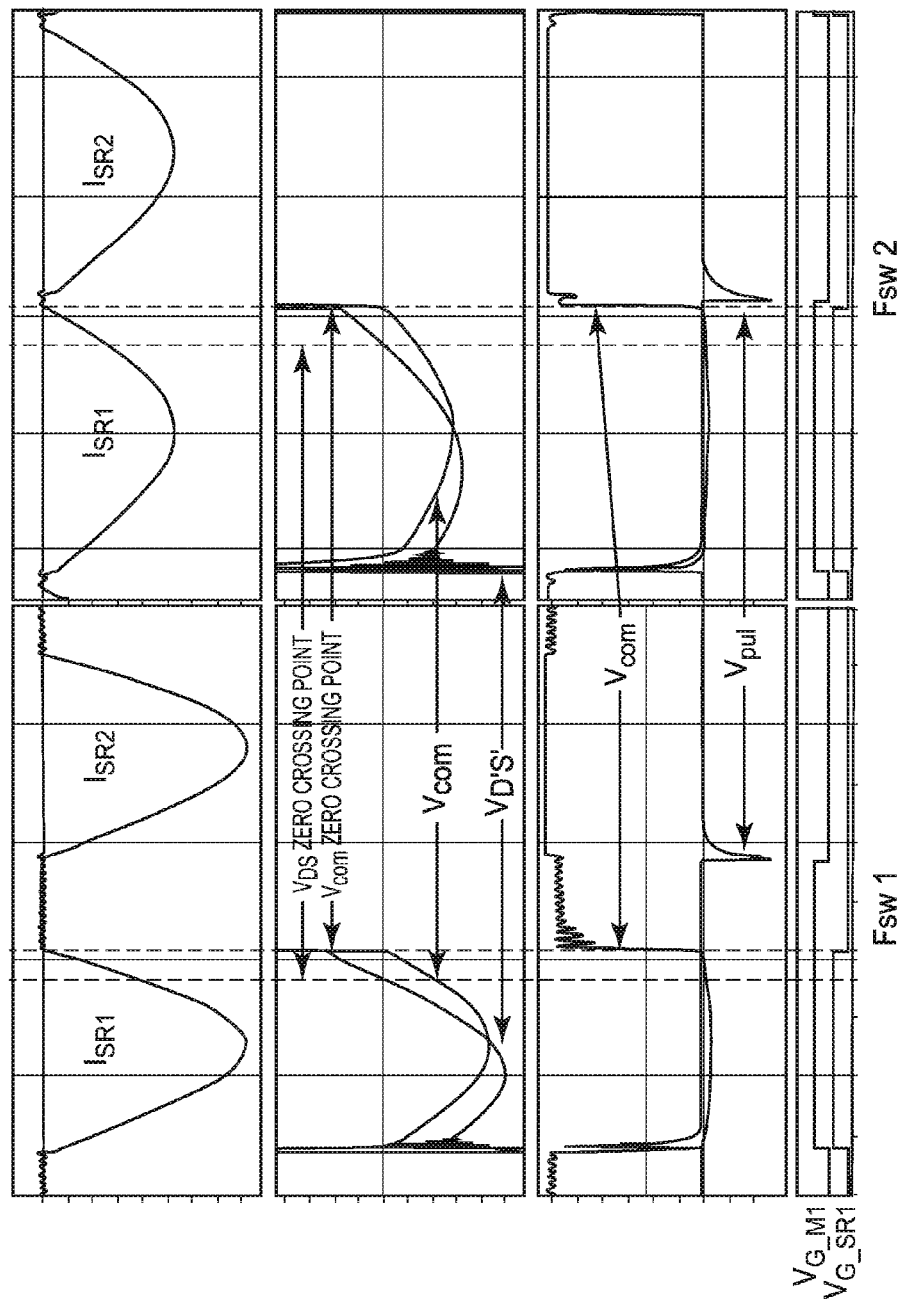
FIG. 13 illustrates voltage and current waveforms associated with the operation of the LLC converter shown in FIG. 12 and FIG. 11.

FIG. 13 shows the operation of the single comparator controller 400 under two different switching frequencies Fsw1 and Fsw2. The simulated waveforms show the compensated sensing signals $V_{com}$ are always in phase with the zero crossing points of $I_{SR1}$, which trigger the signals $V_{G\_SR1}$ to switch off. Whereas the original $V_{DS}$ is always leading $I_{SR1}$ in the zero crossing points with various phase differences. Absent the inductive compensation techniques described herein, such phase differences would have led to early switch off situations. FIG. 13 also shows the voltage comparison between $V_{com}$ and $V_{pul}$. Here, $V_{G\_SR1}$ is triggered on with positive $V_{pul}$ signals from $V_{G\_M1}$. Signal $V_{pul}$ then drops back to zero voltage once capacitor $C_{pul}$ is completely charged and $V_{com}$ goes negative during the conduction period of actively controlled switching element SR1 (as seen by the negative current of $I_{SR1}$). Once the zero crossing point is detected and $V_{com}$ goes positive, $V_{G\_SR1}$ is switched off even when $V_{G\_M1}$ continue to be on. This control is inherently safe since even if $V_{G\_SR1}$ is longer than $V_{G\_M1}$ and a zero crossing event is not detected, once $V_{G\_M1}$ is switched off, the negative pulse forces $V_{com}$ to be higher than $V_{pul}$ and therefore forcing a turn off of $V_{G\_SR1}$ in all cases.

Figure 14:
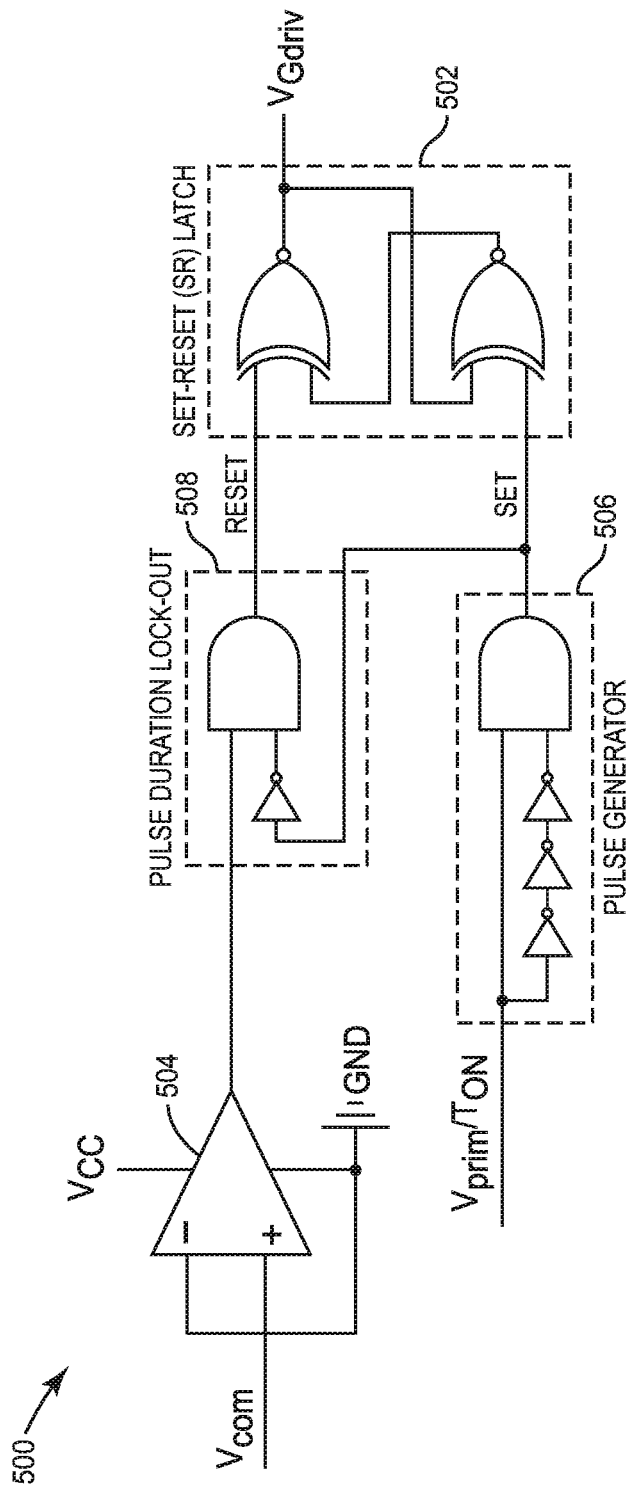
FIG. 14 illustrates a schematic diagram of an embodiment of a digital controller for a synchronous rectification switch inductive compensation circuit.

FIG. 14 illustrates an embodiment of a logic based controller 500. The logic based controller is based on a NOR gated set-reset (SR) latch 502 which holds the output $V_{Gdriv}$ to positive when the set signal is detected and only switches to zero or negative depending on the logic technology when a reset signal is detected. The reset signal for this circuit 502 is the output of a high speed comparator 504, which compares the reference voltage $V_{com}$ signal against the ground/MOSFET source point. The set point is triggered by the primary side gate signal $V_{G\_M1}$ and this signal goes through a pulse generator 506 which can generate a pulse of specific length. Generally, the length of the set point should be $\ll V_{G\_M1}$. Furthermore, the reset signal is also controlled by a lock out circuit 508 which holds the reset signal to its previous value while set is positive. This is to protect the reset signal from false triggering at the beginning from switching oscillations. The output $V_{Gdriv}$ of the SR latch 502 is the control signal for the gate driver of the actively controlled switching element 102.

Figure 15:
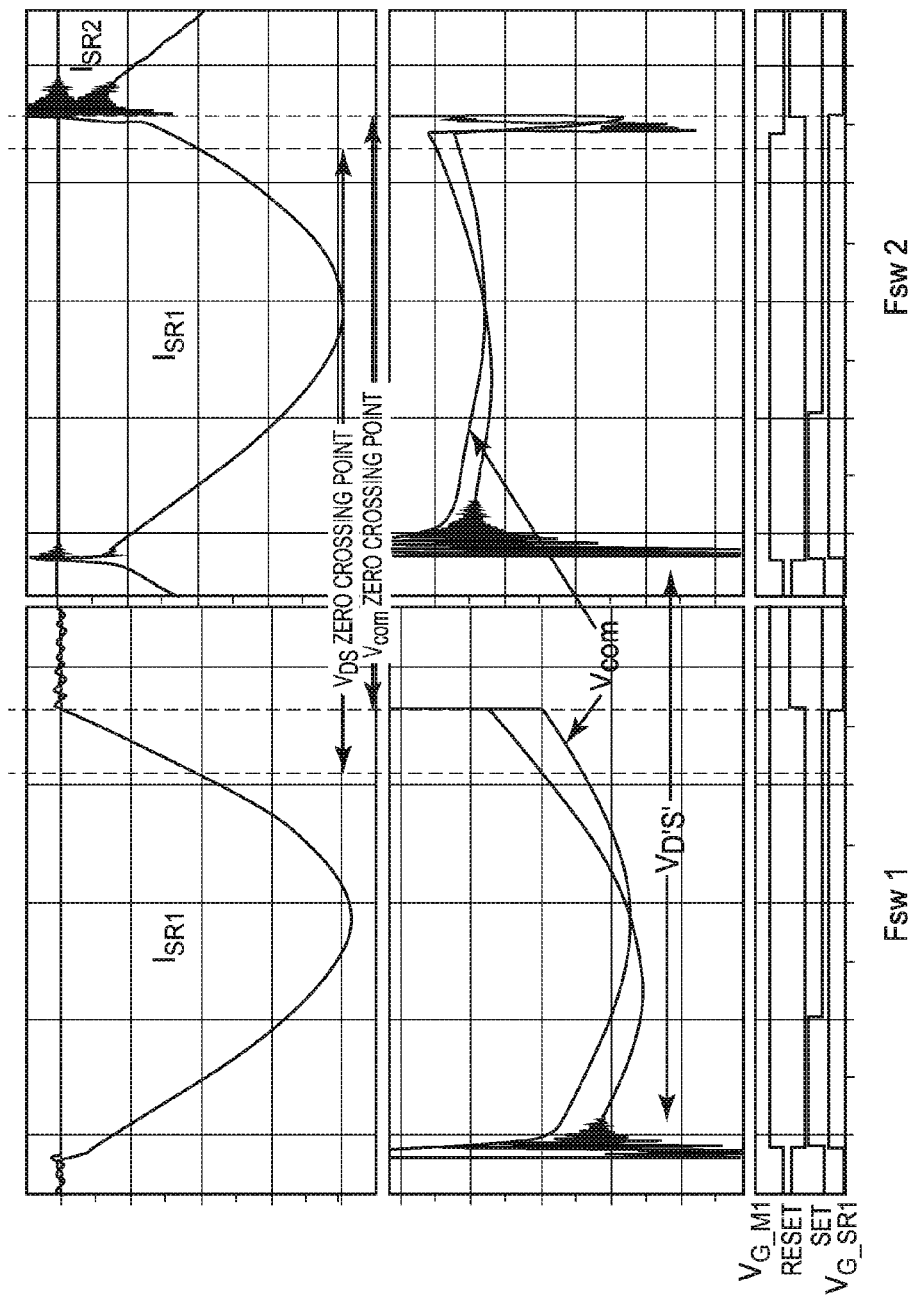
FIG. 15 illustrates voltage and current waveforms associated with the operation of a synchronous rectification switch controlled by the digital controller shown in FIG. 14.

FIG. 15 shows the operation of the logic based controller 500 under two different switching frequencies Fsw1 and Fsw2. Here, $V_{G\_M1}$ triggers the set pulse which triggers $V_{G\_SR1}$ to turn on. Signal $V_{G\_SR1}$ remains on until zero crossing of reference voltage $V_{com}$ signal is detected and the reset signal is triggered which turns off $V_{G\_SR1}$ and the whole process starts again when the set signal is triggered. Unlike the single comparator controller 400, $V_{G\_SR1}$ can remain on even when $V_{G\_M1}$ turns off. This is shown in the Fsw2 waveforms where the switching frequency is higher than the resonant frequency of the LLC converter 402 and $I_{SR1}$ does not reach zero before $V_{G\_M1}$ turns off. At this point, $I_{SR1}$ naturally conducts from the negative direction into the positive direction, forcing a zero current crossing event which triggers a reset signal.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An electronic device, comprising:
a synchronous rectification circuit comprising an actively controlled switching element through which resonant current flows during operation, the actively controlled switching element being disposed in a package which adds stray inductance to a main current path of the synchronous rectification circuit; and
a fixed inductor magnetically coupled to the stray inductance or an additional inductance in series with the stray inductance so that the fixed inductor is not in the main current path of the synchronous rectification circuit and change in current through the inductance to which the fixed inductor is magnetically coupled induces a reference voltage at the fixed inductor which is in phase with a zero crossing point of the resonant current at different switching frequencies of the actively controlled switching element.

2. The electronic device of claim 1, wherein the fixed inductor is electrically connected at one terminal to the inductance to which the fixed inductor is magnetically coupled without being directly in series with the main power path of the actively controlled switching element.

3. The electronic device of claim 1, wherein the fixed inductor and the inductance to which the fixed inductor is magnetically coupled are mismatched.

4. The electronic device of claim 1, wherein the fixed inductor is disposed outside the package.

5. The electronic device of claim 4, wherein the fixed inductor comprises a winding on a circuit board, the circuit board being positioned in close proximity to the package so that the winding is magnetically coupled to the stray inductance or the additional inductance in series with the stray inductance.

6. The electronic device of claim 1, wherein the fixed inductor is attached to an exterior surface of the package so that the fixed inductor is magnetically coupled to the stray inductance or the additional inductance in series with the stray inductance.

7. The electronic device of claim 1, wherein terminals of the package protrude from a material which encases the actively controlled switching element, the terminals being a component of the stray inductance, and wherein the fixed inductor is positioned in close proximity to the terminals of the package so that the fixed inductor is magnetically coupled to the terminals.

8. The electronic device of claim 1, wherein the additional inductance comprises a series inductor electrically disposed in the main current path of the synchronous rectification circuit, and wherein the fixed inductor is magnetically coupled to the series inductor.

9. The electronic device of claim 8, wherein the fixed inductor is electrically connected at one terminal to the series inductor without being directly in series with the main power path of the actively controlled switching element.

10. The electronic device of claim 9, wherein the series inductor is electrically connected to a drain-side of the actively controlled switching element.

11. The electronic device of claim 8, wherein the series inductor comprises a first winding on a circuit board, and wherein the fixed inductor comprises a second winding on the circuit board which is magnetically coupled to the first winding.

12. The electronic device of claim 8, wherein the series inductor and the package are disposed at a first side of a circuit board, and wherein the fixed inductor is disposed at a second side of the circuit board opposite the first side.

13. The electronic device of claim 12, wherein the series inductor comprises a copper trace formed in a first layer of the circuit board, and wherein the fixed inductor comprises a winding formed in a second layer of the circuit board.

14. The electronic device of claim 12, wherein the fixed inductor is electrically connected at one terminal to the series inductor by a conductive via which extends through the circuit board.

15. The electronic device of claim 8, wherein the fixed inductor is disposed on top of the series inductor.

16. The electronic device of claim 1, further comprising a control circuit operable to control switching of the actively controlled switching element based on the zero crossing point of the reference voltage.

17. The electronic device of claim 1, further comprising circuitry operable to compensate for the stray inductance differing from an expected nominal value.

18. The electronic device of claim 1, wherein the synchronous rectification circuit is an LLC converter and the actively controlled switching element is electrically connected to one terminal of a secondary transformer winding of the LLC converter.

19. The electronic device of claim 1, further comprising:
a resistor and a capacitor connected in series between the fixed inductor and ground; and
a first diode and a second diode connected in parallel with the capacitor,
wherein the resistor is configured to limit the current through the resistor and the capacitor,
wherein the capacitor is configured to tune the zero crossing point,
wherein the first and the second diodes are configured to limit the voltage across the capacitor.

20. A method of controlling an electronic device which comprises a synchronous rectification circuit having an actively controlled switching element through which resonant current flows during operation, the actively controlled switching element being disposed in a package which adds stray inductance to a main current path of the synchronous rectification circuit, the method comprising:
magnetically coupling a fixed inductor to the stray inductance or an additional inductance in series with the stray inductance so that the fixed inductor is not in the main current path of the synchronous rectification circuit and change in current through the inductance to which the fixed inductor is magnetically coupled induces a reference voltage at the fixed inductor which is in phase with a zero crossing point of the resonant current at different switching frequencies of the actively controlled switching element; and
controlling switching of the actively controlled switching element based on a zero crossing point of the voltage induced at the fixed inductor.

* * * * *